E. RHEINBACH.
AUTOMATICALLY CLOSING VALVE FOR WATER GAGES.
APPLICATION FILED MAY 23, 1912.
1,089,439. Patented Mar. 10, 1914.
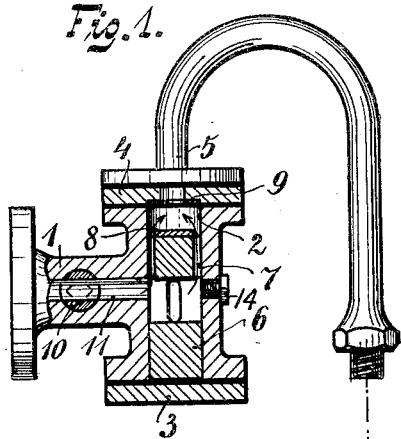
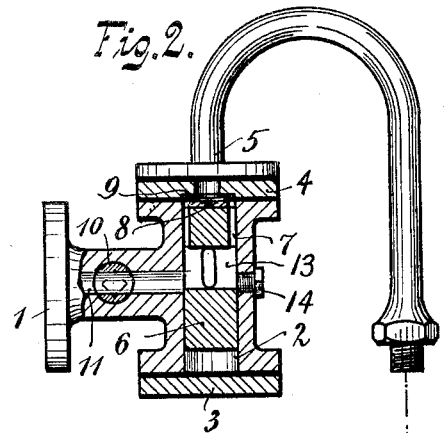
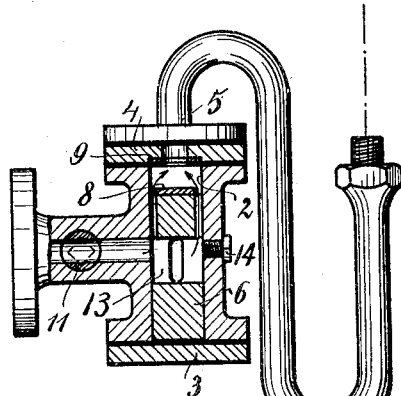
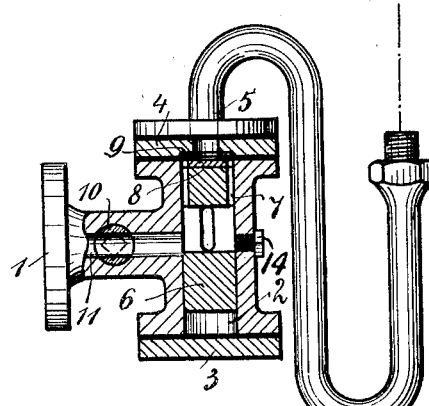
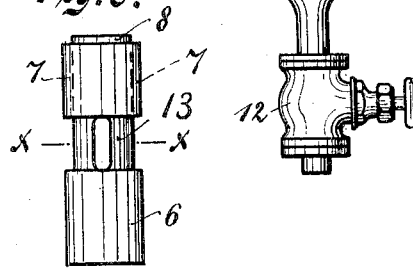
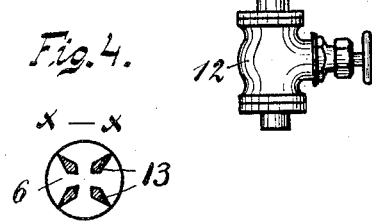
Witnesses:
Otto Blankmeister
John Rugg
Inventor:
Ernst Rheinbach

UNITED STATES PATENT OFFICE.

ERNST RHEINBACH, OF STOLPEN, GERMANY.

AUTOMATICALLY-CLOSING VALVE FOR WATER-GAGES.

1,089,439. Specification of Letters Patent. Patented Mar. 10, 1914.

Application filed May 23, 1912. Serial No. 699,303.

*To all whom it may concern:*

Be it known that I, ERNST RHEINBACH, a subject of the Emperor of Germany, residing at Stolpen, Saxony, Germany, have invented certain Improvements in Automatically-Closing Valves for Water-Gages and the like, of which the following is a specification.

The present invention relates to a valve of the kind fitted behind a water gage or other conduit under pressure and adapted to close automatically in case such element should break.

The invention consists in the provision of a piston-like valve body arranged in a vertically disposed cylindrical casing and provided with grooves through which and through a port in the upper end of the casing the elements at opposite sides of the latter communicate. If, owing to breakage of the elements or leakage of the packing, the equilibrium of the pressure at opposite sides of the casing should be disturbed, the valve body will be thrust against the upper end of the casing so as to close the port and interrupt the communication. A simple and reliable valve is obtained in this manner.

In the accompanying drawings the invention is illustrated by way of example, Figure 1 representing a sectional view of the upper and lower water gage valves in open position, Fig. 2, a similar view of the same in closed position, Fig. 3, an elevation of the valve body, and Fig. 4, a cross-section on the line *x—x* of Fig. 3.

A T-shaped body 1 is connected to the boiler wall so as to hold the cross-piece in a vertical position. The cross-piece is bored through from end to end and fitted with flanges, to the lower one of which a disk 3 is secured so as to close the bore 2. To the upper flange a pipe 5 is connected which leads to and holds the gage glass. The horizontal part of the body 1 has a bore 11 through which the bore 2 communicates with the boiler. Within the bore 2 a piston-like valve body 6 is arranged so as to allow of vertical adjustment. This body is composed of two cylindrical portions which are interconnected and distanced by vertical bars 13 holding the cylindrical portions at opposite sides of the bore 11. The upper portion of the valve body is fitted with longitudinal grooves 7 through which the bore 11 communicates with the pipe 5.

Normally the valve has the position shown in Fig. 1. If, owing to the bursting of the gage glass, the pressure at that side of the valve body should be reduced, the pressure on the upper portion of the valve body will cause the latter to be thrust upward into the position shown in Fig. 2. In this position a rubber disk 8 on the upper end of the valve body is applied to the outlet port so as to close the latter and interrupt the communication between the pipe 5 and the boiler.

It is preferable to arrange a ring 4 between the upper flange of the valve casing and the flange of the pipe 5 so as to form an abutment for the valve body. A rubber washer 9 is mounted in a recess in this ring so as to take the thrust and form the tightening means together with the rubber disk 8. By this arrangement the tightening surfaces will remain permanently clear of deposits which, as is well known, do not adhere to the rubber.

A cock plug 10 is fitted in the casing in the usual manner for closing the bore 11. This bore is extended right through the cross-piece so as to allow of being easily cleaned, the outer end of the bore being normally closed by a screw 14. The cleaning instrument is admitted between the bars 13 of the valve body. A testing valve 12 is provided on the lower pipe 5.

The device may be employed in connection with other elements than gage glasses.

I claim:—

An automatically closing valve for water-gages and the like, comprising a vertical cylindrical casing having an outlet port at its upper end and an inlet port opening at right angles into the casing midway of its length, a piston-like valve body movably mounted in said casing, said valve body being composed of two cylindrical portions distanced by bars which hold said portion normally at opposite sides of the inlet port, the casing having a clearing aperture arranged so as to admit a cleaning instrument into the inlet port from between the bars of the valve, a screw normally closing said clearing aperture, the upper portion of the valve body having longitudinal grooves through which the inlet and outlet port normally communicate, the valve body being adapted to close the outlet port with its upper end when it is raised by a sudden decrease of the pressure outside said outlet port, substantially as set forth.

ERNST RHEINBACH.

Witnesses:
PAUL ARRAS,
CLÄRE SIMON.

Copies of this patent may be obtained for five cents each, by addressing the "Commissioner of Patents, Washington, D. C."